United States Patent [19]

Wilwerding et al.

[11] Patent Number: 4,508,963
[45] Date of Patent: Apr. 2, 1985

[54] DETECTOR MISMATCH CORRECTION APPARATUS

[75] Inventors: Dennis J. Wilwerding, Littleton; James R. Adams, Jr., Westminster, both of Colo.

[73] Assignee: Honeywell Inc., Minneapolis, Minn.

[21] Appl. No.: 425,341

[22] Filed: Sep. 28, 1982

[51] Int. Cl.³ .................................................. G01J 1/20
[52] U.S. Cl. ..................................... 250/201; 354/402; 250/578
[58] Field of Search .......... 250/201, 204, 578, 214 C, 250/214 AG; 354/402, 404, 409, 406, 407; 356/4, 5

[56] References Cited

U.S. PATENT DOCUMENTS

| | | | |
|---|---|---|---|
| 4,185,191 | 1/1980 | Stauffer | 250/204 |
| 4,250,376 | 2/1981 | Joseph et al. | 250/204 |
| 4,309,603 | 1/1982 | Stauffer | 354/404 |
| 4,333,007 | 6/1982 | Langlais et al. | 250/201 |
| 4,359,636 | 12/1980 | Stauffer | 250/204 |
| 4,428,652 | 1/1984 | Sakai et al. | 354/407 |

FOREIGN PATENT DOCUMENTS 2714777 10/1978 Fed. Rep. of Germany ... 250/214 C

*Primary Examiner*—David C. Nelms
*Assistant Examiner*—Jim Gatto
*Attorney, Agent, or Firm*—Charles J. Ungemach

[57] ABSTRACT

Apparatus for correcting the mismatch which occurs in condition responsive detector pairs in a detector array so that the outputs of the detectors in the pairs are substantially the same when they are subjected to substantially the same condition.

10 Claims, 4 Drawing Figures

4,508,963

DETECTOR MISMATCH CORRECTION APPARATUS

BACKGROUND OF THE INVENTION

In the Norman L. Stauffer U.S. Pat. No. 4,185,191 issued Jan. 22, 1980, and assigned to the assignee of the present invention, a range determination system is shown which is usable in a through-the-lens camera for positioning the taking lens at a desired correct focus position with respect to a remote object within the field of view. The system utilizes a plurality of small detectors such as charge coupled devices (CCD) or Charge Injection Devices (CID) mounted in an array to receive radiation from the scene being viewed. The detectors are arranged in pairs with each pair being mounted behind a small lenslet so that each pair receives a view of the exit pupil of the taking lens but one of the detectors in each pair receives radiation primarily from a first portion of the taking lens while the other of the detectors in each pair receives radiation primarily from a different portion of the taking lens. The result is to create two similar curves indicative of the radiation distribution pattern from the scene being viewed. At the proper focus position, both of the detectors of each pair receive substantially the same amount of radiation and the two curves coincide, but as the object changes position with respect to the camera, the detectors in each pair receive different amounts of radiation and the two curves move with respect to each other to indicate an out-of-focus situation.

The accuracy of the system depends upon the matching of the detector pairs so that when they receive the same amount of radiation they produce substantially the same output signals. Unfortunately, it is extremely difficult to manufacture detector pairs that are always closely matched and accordingly in the past, attempts have been made to vary the output of one of the detectors in the pair so as to cause it to match the output of the other detector in the pair when both are subjected to the same radiation. For example, in the co-pending application of Norman L. Stauffer, Ser. No. 213,438, filed Dec. 5, 1980 now U.S. Patent No. 4,359,636 issued Nov. 16, 1982, a detector balance apparatus and method is shown in which portions of one or both of the detectors in a pair are shadowed by pins or strips in order to cause the outputs of the two detectors to be the same under the same conditions. While such apparatus as this is satisfactory to balance a detector pair, it is time consuming and expensive to perform this operation on all of the detector pairs particularly when, as often happens, a mismatch in detector pairs is caused by a manufacturing problem which mismatches all of the detectors in a certain batch.

SUMMARY OF THE INVENTION

The present invention operates to correct the mismatch which occurs in detector pairs by providing a correction to the detectors in an amount which is determined from the outputs of all the detectors in the array. More specifically, the signals from at least one of the detectors in each pair is modified by an amount which depends upon the average mismatch of all of the detectors so that the modified signals become substantially the same as the signals, which may or may not also be modified, from the other of the detectors in each pair, on the average. After thus matching the outputs, the detectors are used, as before, to sense radiation intensities, or other condition magnitudes for auto focus or for other purposes as desired.

DETAILED DESCRIPTION OF THE PREFERRED EMBODIMENTS

Figure 1:
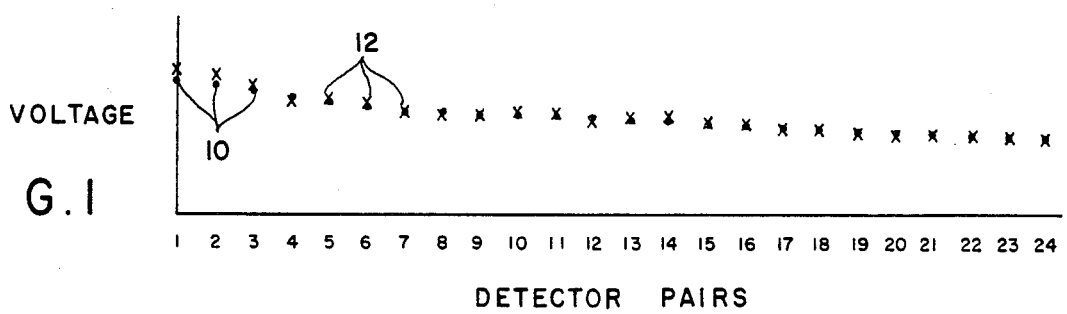
FIG. 1 is a graph showing the outputs of detector pairs in a system where the detector pairs are satisfactorily matched.

FIG. 1 shows a graph depicting the outputs of 24 pairs of detectors as they might be received in series fashion from the output terminal of a shift register, for example, when all detectors are illuminated substantially equally. In FIG. 1 the outputs of a first of the detectors in each pair, the "a" detectors, are shown as dots such as are indicated by reference numeral 10 while the outputs of the other detectors, the "b" detectors, are shown as X's such as are shown by reference numeral 12 in FIG. 1. It is seen in FIG. 1 that the outputs of the detector pairs are fairly close together throughout the entire range of the 24 detectors shown. There are, very slight mismatches which may occur in a single detector pair by overall the outputs of the detector pair are substantially the same. It is seen that the voltage drops from a high point at the detector 1 pair on the left side of FIG. 1 slightly to a low point at detector 24 on the right side of FIG. 1 which is accounted for by virtue of the fact that as the shift register shifts the charges from one position to the next so as to bring them out of the CCD device in series, a small amount of charge is lost with each shift. This does not affect the output of the device significantly and accordingly when the outputs of the detectors are matched as shown in FIG. 1, they can be utilized to sense a condition such as radiation intensity to determine the proper focus position as explained in the above referred to Stauffer U.S. Pat. No. 4,185,191.

Figure 2:
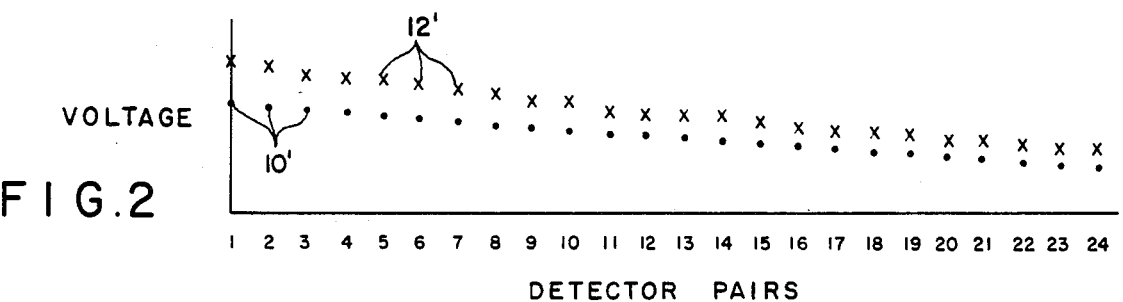
FIG. 2 shows a graph of a system in which the outputs of the detector pairs are mismatched.

FIG. 2 shows 24 pairs of detectors in which the outputs in each pair are mismatched considerably probably because of an error in the manufacturing process even though all detectors are illuminated substantially equally. In FIG. 2 the outputs of the "a" detectors are shown by reference numeral 10' and the outputs of the "b" detectors are shown by reference numeral 12' and it is seen that the outputs of the "b" detectors are higher than the outputs of the "a" detectors. It is also seen that the detector pair 1 at the left side of FIG. 2 is mismatched by a greater amount than the detector pair 24 at the right side of FIG. 2 but that the percentage of mismatch is approximately the same throughout the entire set of detectors. Accordingly, if either the "a" or "b" detectors are multiplied by a predetermined percentage value indicative of the average percentage mismatch or, if both "a" and "b" detectors are multiplied by a different value so as to raise the level of the "a" detector outputs and lower the level of the "b" detector outputs, then the outputs of the detector pairs can be brought closely together so that they will resemble the graph shown in FIG. 1.

Figure 3:
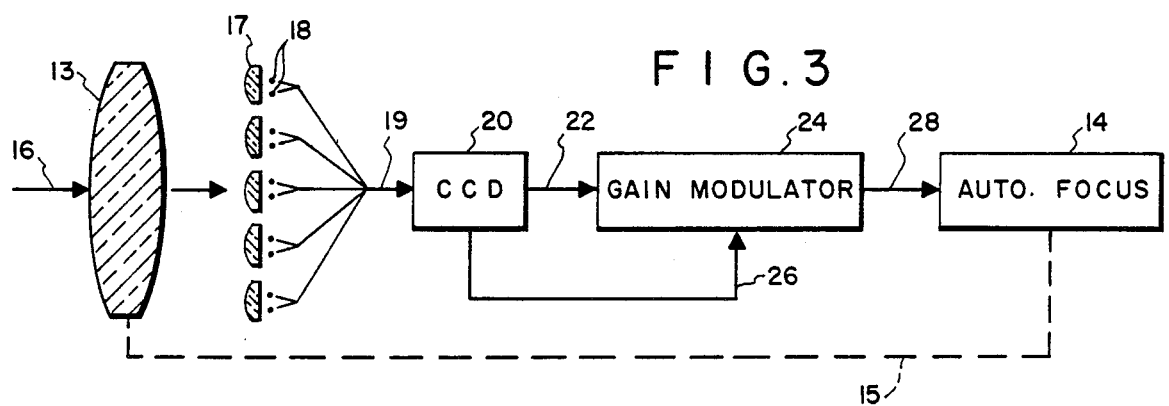
FIG. 3 shows a schematic representation of a system for correcting the outputs of mismatched detectors in an array.

One way of accomplishing the modifications of the signals from one or both of the detectors in each of the pairs by a predetermined value is shown in FIG. 3. In FIG. 3 a moveable lens 13 is shown positioned by an auto focus apparatus 14 through a mechanical connection shown as dashed line 15. Radiation from a remote object travels to lens 13 along a path shown by arrow 16 and from lens 13 to a plurality of lensletts 17 and detector pairs 18 shown connected by a line 19 to a CCD device 20. As explained in the above-mentioned U.S. Pat. No. 4,185,191 signal from the detector pairs indicative of radiation distribution patterns may be used to determine the range to the remote object so that with proper auto focus circuitry the lens 13 may be positioned at a desired proper focus position.

The CCD device 20, may include a shift register for producing a chain of output voltages serially on an output line 22 representative of the individual voltages from the "a" and "b" detectors in the detector pairs in a manner such as is shown in the James D. Jospeh et al U.S. Pat. No. 4,250,376 issued Feb. 10, 1981, and assigned to the assignee of the present invention. Line 22 is shown connected to a gain modulator 24 which has an additional input 26 shown connected to the CCD device 20 for purposes of synchronization, as will be explained, and operates to change the gain produced by modulator 24 selectively in accordance with the detector pair signals being produced by the CCD device 20. Gain modulator 24 is shown producing an output on line 28 connected to auto focus apparatus 14. The output on line 28 will be a series of signals representing the individual detector outputs as modified by the modulator 24 and, when properly modulated, those signals would be substantially equal on the average when the detectors received the same radiation. More specifically, if it were determined, for example, that in FIG. 2 the "a" detector outputs 10' should be multiplied by a factor 1.02 to bring them up to substantially match the outputs of the "b" detectors 12' then the synchronized input 26 to the gain modulator 24 would cause the gain modulator 24 to increase the gain to 1.02 when the "a" detector signals were present on line 22 but not when the "b" detector signals were present on line 22. Accordingly, each "a" detector signal would have its gain multiplied by 1.02 whereas each "b" detector signal would not. Thus the output on line 28 would have "a" and "b" signals more closely approximating that shown in FIG. 1 since all of the "a" detector signals would have been increased by a multiple 1.02 to bring them up to the "b" signal level when both detectors in each pair are subjected to the same intensity of radiation. Of course, the outputs of the "b" detectors could be decreased to the "a" signal level, or, as will be shown in FIG. 4, the "a" detector outputs could be decreased some while the "b" detector outputs were decreased even more to again bring them to the same level when the detectors in each pair received the same radiation.

Figure 4:
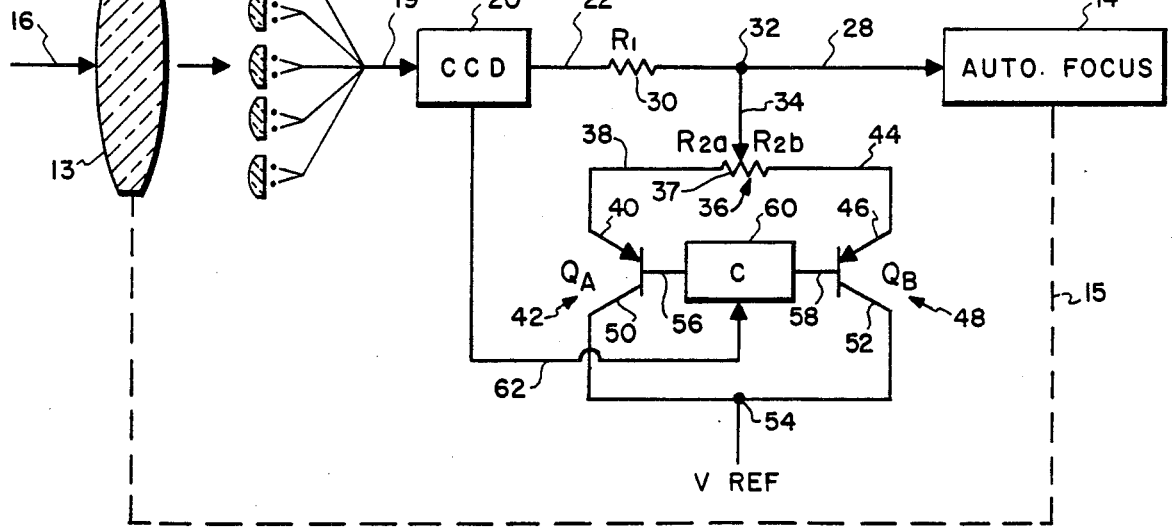
FIG. 4 shows a schematic representation of a specific circuit for correcting the output mismatching in a detector array.

In FIG. 4, a specific circuit for providing the correction described in connection with FIG. 3 is shown. In FIG. 4 the lens 13, auto focus circuit 14, detector pairs 18 and the CCD device 20 are again shown operable to produce an output on a line 22 comprising the series of signals representing the outputs of the "a" and "b" detectors. In FIG. 4 these signals are fed through a resistor 30 labelled $R_1$ to a junction point 32 connected as the output 28 to the auto focus circuit 14. Junction point 32 is also connected by a line 34 to the wiper of a variable resistor 36 having a resistance portion 37. The resistance portion 37 is shown divided into two sections, that on the left hand side of the wiper 34 is labelled $R_{2a}$ while that on the right hand side of wiper 34 is labeled $R_{2b}$. By moving wiper 34 from the left to the right $R_{2a}$ can be made greater while $R_{2b}$ is made smaller. Likewise, moving the wiper 34 from the right to the left will make $R_{2b}$ larger while making $R_{2a}$ smaller. The left hand side of the resistance portion 37 of variable resistor 36 is shown connected by a line 38 to the emitter 40 of a PNP transistor 42 labeled QA which operates as a switch. The right hand side of the resistance portion 37 of variable resistor 36 is shown connected by line 44 to the emitter 46 of a PNP transistor 48 labelled QB which also operates as a switch. A collector 50 of transistor 42 and a collector 52 of transistor 48 are connected together at junction point 54 which is shown connected to a source of voltage $V_{REF}$. The value of $V_{REF}$ is chosen to be the same as the signal from the CCD detectors on line 22 when they are not exposed to any radiation at all. This value has been predetermined for a particular detector array and may be transmitted as one of the first signals appearing from the CCD device 20 before the signals from the "a" and "b" detectors start to emerge. The $V_{REF}$ may then be set by moving a voltage divider wiper (not shown) to the proper position. Of course if the detectors used have a zero output signal in the absence of radiation, the voltage $V_{REF}$ will be made zero or ground.

The base 56 of transistor 42 and the base 58 of transistor 48 are shown connected to a control device 60 which may be a standard divide-by-two flip-flop with its Q output connected to base 56, its $\overline{Q}$ output connected to base 58 and its CP input connected to a line 62 from the CCD device 20 for purposes of synchronization. More particularly, CCD device 20 will produce a first signal when any "a" detector signals is present on line 22 causing control device 60 to turn on transistor 42 and a second signal when any "b" detector signals is present on line 22 causing control device 60 to turn on transistor 48. When control device 60 is a flip-flop, the Q and $\overline{Q}$ outputs would be alternately controlled by signals on line 62 to bring the voltage on the bases 56 and 58 to the required potential to turn transistors 42 and 48 on and off. Since CCD device 20 produces the "a" and "b" signals alternately, normally, a clock could generate the control signals on line 62.

With the wiper of variable resistor 36 set at its midpoint, the value of $R_{2a}$ and $R_{2b}$ are the same and both "a" and "b" signal values will be decreased by essentially the same amount, the exact amount of the decrease being dependent upon the resistor divider $R_1, R_{2a}$ and $R_1, R_{2b}$. For the wiper of variable resistor 36 set to any other than its midpoint position, the decrease in the signal of "a" will be different than the decrease in the signal of "b" and thus the relative mismatch such as shown, for example, in FIG. 2 can be corrected.

By observing the outputs of the detector pairs and forming a graph such as shown in FIG. 2 it may be determined by what value the "a" and "b" detector signals should be multiplied in order for them to produce substantially the same output on line 28 when they are subjected to the same radiation. If, for example, it is determined that the "b" detectors are, on the average, 2% higher than the "a" detectors, then the wiper 34 of variable resistor 36 may be moved slightly to the right in FIG. 4 so that the resistance $R_{2a}$ is slightly more than the resistance $R_{2b}$ causing the decrease in the "a" signal to be slightly less than the decrease in the "b" signal.

In synchronization with the "a" and "b" signals on line 22, control signals will be presented via line 62 to the control 60 which then will produce a first output on line 56 turning transistor 42 to an "on" condition and transistor 48 to an "off" condition when a signal from an "a" detector is being presented by the CCD device 20 on line 22. When this occurs, current will flow through Resistor $R_1$, junction point 32, resistor $R_{2a}$ and transistor 42 to junction point 54. The size of the signal at junction point 32 (which at this time is an "a" signal) will be decreased by a percentage representative of the position of wiper 34 on variable resistor 36. When the CCD device 20 produces the next signal it will be indicative of a "b" detector signal and accordingly the signal on line 62 from the CCD device 20 to control device 60 will cause control device 60 to turn on transistor 48 via line 58 and shut off transistor 42. The current will now flow through resistor $R_1$, junction 32, resistor $R_{2b}$ and transistor 48 to junction point 54. The size of the signal at junction point 32 (which at this time is a "b" signal) will be decreased by a percentage representative of the position of wiper 54 on variable resistor 36. Since $R_{2b}$ is set to be slightly less than $R_{2a}$ the decrease of the "b" signal will be more than that of the "a" signal and accordingly at the output 28, when the variable resistor wiper 34 has been properly set, the "a" and "b" signals will be substantially the same. The next signal from the CCD device 20 will be another "a" signal and again the control device 60 will turn off transistor 48 and turn on transistor 42 so that the "a" signal will be decreased at junction point 32 according to the value set by resistance $R_{2a}$. This process is repeated for each "a" and "b" signal coming from CCD device 20 and it is seen that each of the "a" signals will be decreased by a certain percentage, and each of the "b" signals decreased by a slightly larger percentage thereby causing the output shown in FIG. 2 to be more like those shown in FIG. 1. Of course, one need not make a plot of the output of each detector as in FIG. 2 in order to calculate where wiper 34 should be placed, and, in fact, no calculation need be made at all. In practice, the detectors will be subjected to the same light intensity so that their outputs ought to be equal. The signals on line 22 from the detectors are presented to the circuit of FIG. 4 and the $V_{REF}$ value set by observing the coded value presented as an early output from CCD device 20. The when the "a" and "b" signals are being presented on line 22 and the synchronized control signals are being presented on line 62, the operator need only to manually move the wiper 34 until the output signals on line 28 are equal. He will know which way to move wiper 34 by the sign of the signal difference on the line 28. For example, if the "b" signals are larger than the "a" signals, as in the example of FIG. 2, then the wiper 34 should be moved to the right, if the opposite is the case, then the wiper 34 should be moved to the left. A simple indicator attached to lines 28 and 62 would provide the desired direction information.

If the detector outputs were properly matched to begin with, as is shown in FIG. 1, then the voltage divider wiper 34 in FIG. 4 would be set on resistance portion 37 at a position where $R_{2a}$ was substantially equal to $R_{2b}$ in which case both the "a" and "b" signals from CCD device 20 would be decreased by the same factor and would emerge on the output 28 substantially equal with regard to respective magnitude.

Of course it will be obvious to one skilled in the art that there are many other ways of multiplying the "a" signals so that they match the "b" signals throughout the entire range of all of the detectors in the array. For example, if the output of CCD device 20 were a series of digital words, each word being representative of the value of an "a" or "b" signal, then a software correction performed by a computer would be entirely possible.

Assume, for example, as is shown in the above referenced U.S. Pat. No. 4,250,376 that the outputs of the "a" and "b" detectors are presented to an Algorithm Processor which operates upon them in accordance with the equation:

$$\sum_{n=1}^{m-1} |a_n - b_{n+1}| - |a_{n+1} - b_n|.$$

then the Algorithm Processor could be arranged to process all of the "a" signals so as to form a partial sum S1 representative of the total of the "a" signals and similarly to process all of the "b" signals to form a second sum S2 representative of the total of the big "b" signals. The Algorithm Processor could then, by the subtraction S1-S2, determine the average error between the "a" and the "b" signals and the desired correction factor and use this correction factor to multiply all of the "a" and/or "b" signals in the above equation to provide the desired correction.

These and many other obvious modifications will occur to those skilled in the art. I therefore do not wish to be limited by the specific disclosures used in connection with the description of the preferred embodiments. I intend only to be limited by the following claims.

What is claimed is:

1. Apparatus for use with a system in which a plurality of first detectors and a plurality of second detectors are exposed to variable conditions and each detector is operable to produce a signal of magnitude indicative of the condition to which it is exposed, the apparatus being operable to at least partly correct for a mismatch of detectors that causes the magnitude of the signals from the first detectors to differ from the magnitude of the signals from the second detectors when they are exposed to the same condition, the signals from the first detectors and the signals from the second detectors being presented in serial fashion at a first output of the system and a first control signal being presented at a second output of the system each time a signal from a first detector is presented at the first output, comprising:

modifying means having first and second inputs and an output, said modifying means operable upon receipt of a control signal at the second input to modify any signal at the first input to produce a modified signal at the output of said modifying means;

means connecting the first input to the first output of the system so that said modifying means receives the signals from the first and second detectors in serial fashion; and means connecting the second input to the second output of the system so that said modifying means receives the first control signal each time a signal from a first detector appears at the first input, said modifying means modifying all of the signals from the first detectors by a first value and all of the signals from the second detectors by a second value which causes the modified signals at the output of said modifying means to have substantially the same magnitude when the first and second detectors are exposed to the same condition.

2. Apparatus according to claim 1 wherein the variable conditions are radiation intensities from a remote object, and the system is a range-finding system.

3. Apparatus according to claim 2 wherein the range-finding system is in a camera, the taking lens of which is positioned to produce a satisfactory focus of the remote object and wherein the detectors are arranged in pairs to receive an image of the exit pupil of the taking lens which, when in the proper focus position produces equal radiation on both detectors in each pair.

4. Apparatus according to claim 1 wherein the modifying means comprises a gain modulator which changes gain upon receipt of a control signal.

5. Apparatus according to claim 3 wherein the modifying means comprises a gain modulator which changes gain upon receipt of a control signal.

6. Apparatus according to claim 1 wherein a second control signal is presented at the second output of the system each time a signal from a second detector is presented at the first output and said modifying means modifies the signals from the second detectors by a second value.

7. Apparatus according to claim 6 wherein the modifying means comprises a variable resistor having a wiper connected to the first output of the system and having a resistance portion one end of which is connected through a first switch to a source of reference voltage and the other end of which is connected through a second switch to the source of reference voltage and having a control device connected to the second output of the system and which closes the first switch and opens the second switch upon receipt of the first control signal and which closes the second switch and opens the first switch upon receipt of the second control signal.

8. In a system which has a plurality of first detectors $a_1, a_2, —a_n$ and a plurality of second detectors $b_1, b_2, —b_n$ arranged in pairs $a_1b_1, a_2b_2, —a_nb_n$, that are positioned to receive radiation from a remote object, each detector operable to produce a signal of magnitude indicative of the radiation it receives, the system supplying, at a first output, the signals from the "a" and "b" detectors in series and, at a second output, a control signal indicative of when the first output is supplying a signal from an "a" detector and from a "b" detector, the improvement being apparatus to help assure that the signals from the "a" detectors are of substantially the same magnitude as the signals from the "b" detectors, on the average, when both detectors in each pair receive substantially the same radiation, comprising:

a modifier having a first input connected to the first output to receive the signals from the "a" and "b" detectors, and a second input connected to the second output to receive the control signal, said modifying means operating in a first mode upon receipt of a control signal indicative of a signal from an "a" detector to modify all of such signals by a first value and operating in a second mode upon receipt of a control signal indicative of a signal from a "b" detector to modify all of such signals by a second value, the first and second values chosen so that the modified signals have substantially the same magnitude, on the average, when both detectors in each pair receive substantially the same radiation.

9. Apparatus according to claim 8 wherein the modifier is a gain modulator which can selectively control the gain on signals from an "a" detector separately from the gain on signals from a "b" detector.

10. Apparatus according to claim 9 wherein the gain modulator comprises a variable resistor having a wiper connected to the first input and having a resistance portion, the ends of which are connected through first and second switches to a reference potential, the first of the switches being closed and the second of the switches being open by a control signal indicative of the presence of an "a" signal at the first output and the first of the switches being opened and the second of the switches being closed by a control signal indicative of the presence of "b" signal at the first output, the position of the wiper on the windings separately controlling the amount of decrease of signal amplitude on signals from an "a" detector and the amount of decrease of signal amplitude on signals from a "b" detector.

* * * * *